(12) United States Patent
Huber et al.

(10) Patent No.: US 8,317,276 B2
(45) Date of Patent: Nov. 27, 2012

(54) FURNITURE DRIVE FOR DRIVING A MOVABLE FURNITURE PART

(75) Inventors: Edgar Huber, Hard (AT); Gerald Friesenecker, Lauterach (AT)

(73) Assignee: Julius Blum GmbH, Hochst (AT)

( * ) Notice: Subject to any disclaimer, the term of this patent is extended or adjusted under 35 U.S.C. 154(b) by 85 days.

(21) Appl. No.: 12/878,256

(22) Filed: Sep. 9, 2010

(65) Prior Publication Data

US 2010/0327717 A1  Dec. 30, 2010

Related U.S. Application Data

(63) Continuation of application No. PCT/AT2009/000100, filed on Mar. 13, 2009.

(30) Foreign Application Priority Data

Mar. 21, 2008 (AT) .................................. A 447/2008

(51) Int. Cl.
*A47B 57/00* (2006.01)
(52) U.S. Cl. .......... 312/319.5; 74/113; 16/286; 318/560
(58) Field of Classification Search .................. 318/560, 318/114, 127, 280, 630, 400.41, 491; 312/34.2, 312/319.5, 319.7; 16/286; 74/113, 114, 74/329, 335; 160/170
See application file for complete search history.

(56) References Cited

U.S. PATENT DOCUMENTS

| | | | | |
|---|---|---|---|---|
| 4,225,182 A * | 9/1980 | Werner | ........................ | 297/362 |
| 6,550,788 B2 * | 4/2003 | Schmidt et al. | ............ | 280/5.511 |
| 7,500,287 B2 * | 3/2009 | Brustle | ........................... | 16/286 |
| 2003/0209227 A1 | 11/2003 | Muraji | | |
| 2007/0114960 A1 | 5/2007 | Hillen | | |
| 2007/0175099 A1 * | 8/2007 | Kachouh | ........................ | 49/340 |
| 2011/0062842 A1 * | 3/2011 | Huber et al. | ............... | 312/319.5 |

FOREIGN PATENT DOCUMENTS

| | | |
|---|---|---|
| AT | 7 573 | 5/2005 |
| DE | 197 39 851 | 3/1999 |
| DE | 101 25 085 | 12/2002 |
| EP | 1 194 708 | 4/2002 |
| EP | 1 329 618 | 7/2003 |
| EP | 1 788 179 | 5/2007 |
| EP | 1 898 036 | 3/2008 |
| JP | 2004-190413 | 7/2004 |

OTHER PUBLICATIONS

International Search Report issued Dec. 3, 2009 in International (PCT) Application No. PCT/AT2009/000100.
Austrian Patent Office Search Report dated Jan. 29, 2009 in Austrian Patent Application A 447/2008.

* cited by examiner

*Primary Examiner* — Antony M Paul
(74) *Attorney, Agent, or Firm* — Wenderoth, Lind & Ponack, L.L.P.

(57) ABSTRACT

A furniture drive is provided for driving a movable piece of furniture. The drive includes an electric motor, an actuator that can be moved back and forth between two end positions to apply a force on the piece of furniture to be driven, and a gearbox connected between the electric motor and actuator. The gearbox has at least one gear stage configured as an eccentric gearbox and includes two gear wheels that mesh with each other. One of the two gear wheels is firmly connected or coupled to the actuator, and the other gear wheel is coupled to the electric motor such that the eccentric gearbox has two limit positions which correspond to the end positions of the actuator. Upon a rotation of the gear wheels, starting from the limit positions, the gear ratio decreases over a deformed rotational angle range.

20 Claims, 7 Drawing Sheets

FURNITURE DRIVE FOR DRIVING A MOVABLE FURNITURE PART

This application is a Continuation of International application No. PCT/AT2009/000100, filed Mar. 13, 2009.

BACKGROUND OF THE INVENTION

The present invention concerns a furniture drive for driving a movable furniture part comprising an electric motor, an actuator reciprocatable between two end positions to apply force to the furniture part to be driven, and a transmission connected between the electric motor and the actuator. The transmission has at least one transmission stage in the form of an eccentric transmission with two mutually meshing gears.

For various reasons (lower procurement costs, amount of space required, power requirement), it is desirable to use an electric motor which is as small as possible and which in addition is intended to advantageously manage without a complicated electronic regulating system for torque regulation.

Austrian patent application No A 1542/2007 of earlier priority to the present applicant discloses a furniture drive having a varying transmission ratio which is achieved by an elbow lever arrangement.

EP 1 194 708 B1 describes a drive apparatus for driving an actuator with a transmission stage in the form of an eccentric transmission, the eccentric transmission having two mutually meshing gears. That specification teaches that in many situations of use for transmissions, a maximum drive output torque is required only in one position, in which respect such requirements are said to occur for example in relation to transmissions which perform a closing function.

In accordance with that specification, a drive by way of an electric motor and a transmission with a constant transmission ratio suffers from the disadvantage that the level of the transmission ratio on the one hand must be so high that the maximum torque can be achieved with the electric motor used, which generally requires a high transmission ratio. On the other hand, a high transmission ratio is said to also signify a long setting time for the transmission.

Instead of a transmission with a constant transmission ratio, EP 1 194 708 B1 proposes a two-stage transmission, the first transmission stage being in the form of a shaft transmission (harmonic drive transmission) and the second stage being in the form of an eccentric transmission.

This specification does not teach specific examples of advantageous transmission ratio configurations. Particular attention is directed to the interplay between torque and setting time.

EP 1 194 708 B1 is of only very limited significance by virtue of its fixation with the ratio between torque and setting time in situations of use where that ratio plays only a very subordinate part.

EP 1 898 036 A1 discloses an operating actuator for a vehicle flap provided with an eccentric transmission having two mutually meshing gears. That specification teaches that, in relation to motor vehicle flaps, it is necessary to act on the motor vehicle flap with a sufficiently high torque to overcome the reaction forces caused by a seal during the closing process. That is resolved in such a way that the vehicle flap is actuated by way of a comparatively low transmission ratio during the predominant part of the closing movement. When the motor vehicle flap is approaching the closed position and in particular when it is pressed against a seal, it is driven at a higher transmission ratio.

The opening movement is not discussed in EP 1 898 036 A1, which is to be attributed to the fact that vehicle flaps are mostly opened manually.

Therefore EP 1 898 036 A1 is not relevant in relation to a furniture drive of the general kind set forth, having an actuator which is reciprocated between two end positions.

DE 197 39 851 A1 represents an even more remote state of the art. That specification teaches a windscreen wiper apparatus with two windscreen wiper levers which are driven by a single electric motor, wherein there is provided an eccentric transmission for producing a retardation or an acceleration of the reciprocating movement of the windscreen wiper levers in predetermined regions.

SUMMARY OF THE INVENTION

The object of the invention is to provide a furniture drive which, using a per se known eccentric transmission, has a more advantageous operating characteristic than those furniture drives in which the transmission ratio is constant over the entire course of movement of the movable furniture part.

The invention attains that object by a furniture drive having the features of described below.

The fixed connection of one of the two gears of the eccentric transmission to the actuator and the fact that the two gears of the eccentric transmission mesh with each other ensures that there is a 1:1 correspondence between the position of the actuator and the relative position of the two gears of the eccentric transmission. As a result, the eccentric transmission has two end positions corresponding to those of the actuator. That measure further makes it possible to provide that the transmission ratio decreases upon a rotation of the gears of the eccentric transmission starting from the two end positions, over a defined rotary angle range.

In the furniture drive according to the invention, therefore, the torque exerted by the electric motor on the actuator by way of the transmission in the region of the end positions of the eccentric transmission and by way of the above-discussed correspondence is thus also greater in the region of the corresponding end positions of the actuator than in a region between the end positions of the actuator. In the mounted condition of the furniture drive on or in a furniture carcass, with the actuator being connected to the furniture part to be driven, the end positions of the actuator correspond to a closed or entirely opened position respectively of the furniture part to be driven. In accordance with the invention, therefore, at the time of starting from the end positions, when the electric motor first starts slowly, a particularly high level of torque is available. In both end positions (closed or entirely opened), therefore, an optimum torque is available by virtue of the measures according to the invention.

It is to be noted that the fixed connection or coupling of one of the two gears of the eccentric transmission to the actuator can naturally be releasable in itself in order for example to facilitate mounting of the furniture drive or to replace parts. The only essential point is that, during operation of the furniture drive, it is possible to ensure a correspondence between the end positions of the actuator and the end positions of the eccentric transmission by virtue of the connection or coupling.

Further advantageous embodiments of the invention also described below. The invention is also directed to an article of furniture having a movably mounted furniture part (for example flap, door or drawer) having a furniture drive according to the invention.

BRIEF DESCRIPTION OF THE DRAWINGS

Further advantages and details of the invention will be apparent from the Figures and the related specific description. In the drawing.

DETAILED DESCRIPTION OF THE INVENTION

Figure 1:
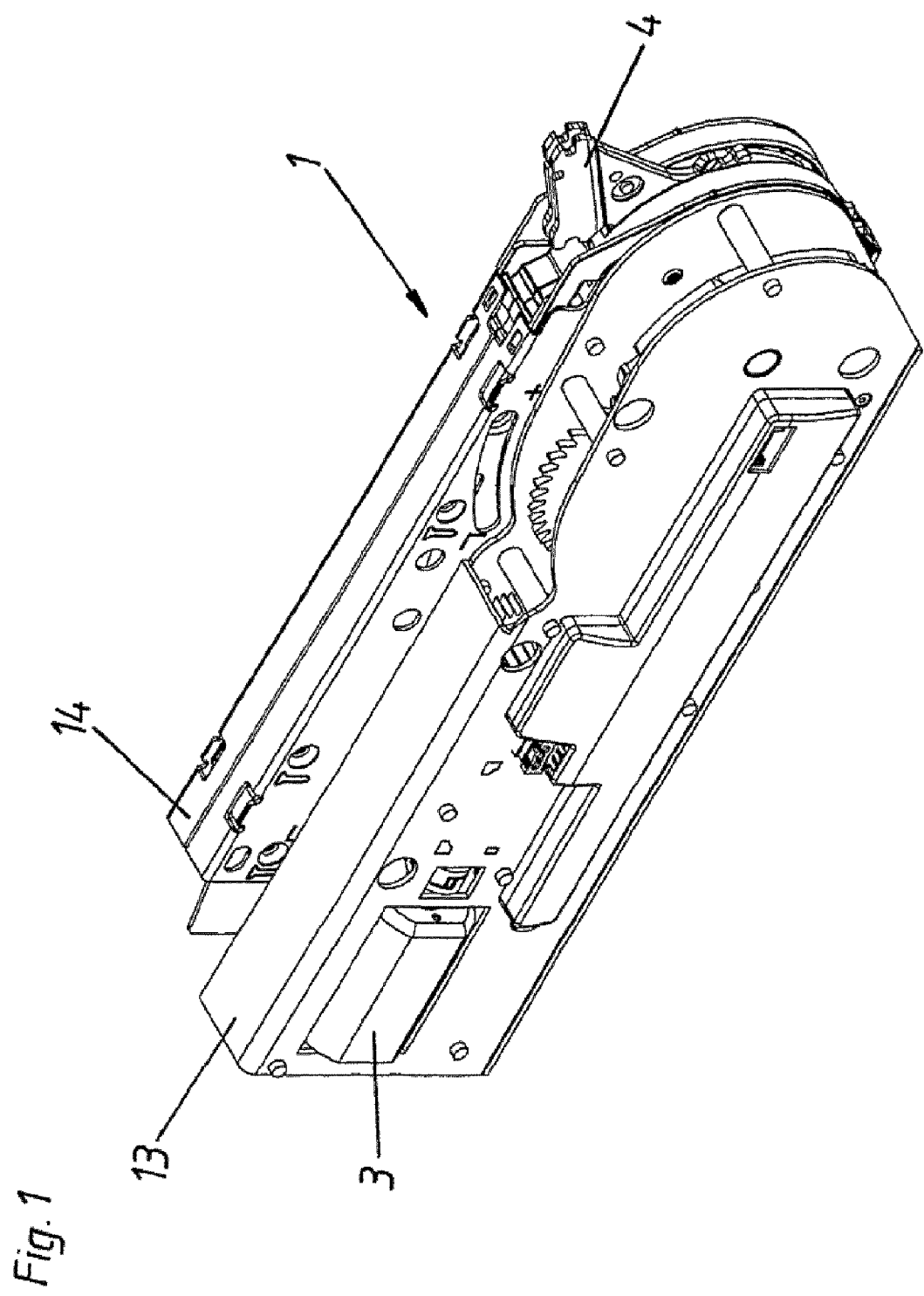
FIG. 1 shows a perspective view of a furniture drive according to the invention.

In the first embodiment, the furniture drive 1 shown in FIG. 1 comprises two releasably connected units 13, 14. In that respect, the unit 14 represents an actuating drive which in itself is fully functional for a furniture flap, as is known per se so that it does not have to be described in greater detail herein. Particular attention is only to be directed to the actuator 4 which is arranged here in the region of the unit (actuating drive) 14 and by way of which force is applied to the movable furniture part 2 by way of a lever mechanism 15 (see FIG. 5).

The electric motor 3, the transmission 5 and a shaft 12 non-rotatably connected to the actuator 4 are arranged in the unit 13 which is described in greater detail in the following Figures.

Figure 2A:
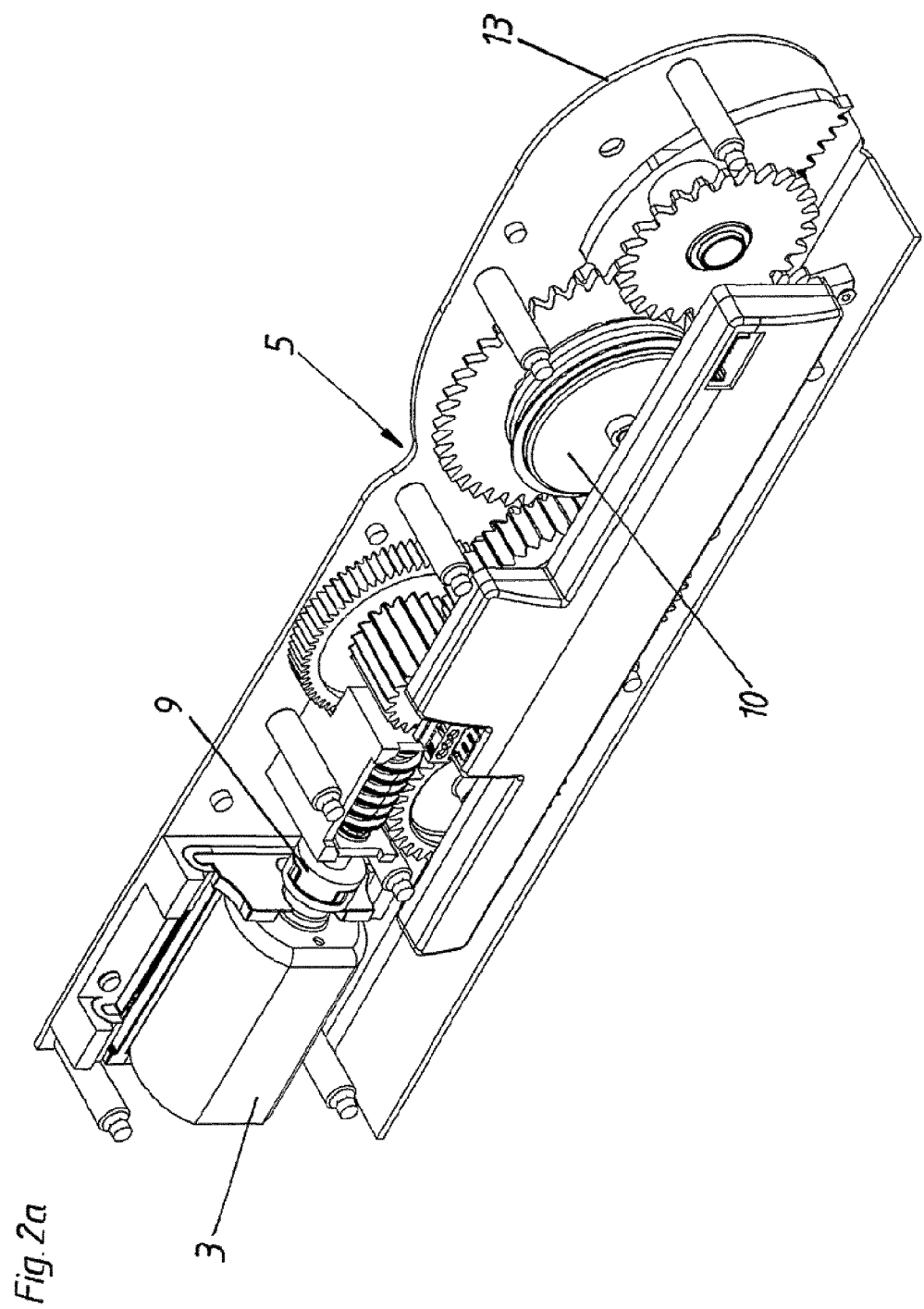
FIGS. 2a and 2b show the line of drive force between the electric motor and the actuator of the furniture drive shown in FIG. 1 as a perspective view from the front and from the rear, respectively.
Figure 2B:
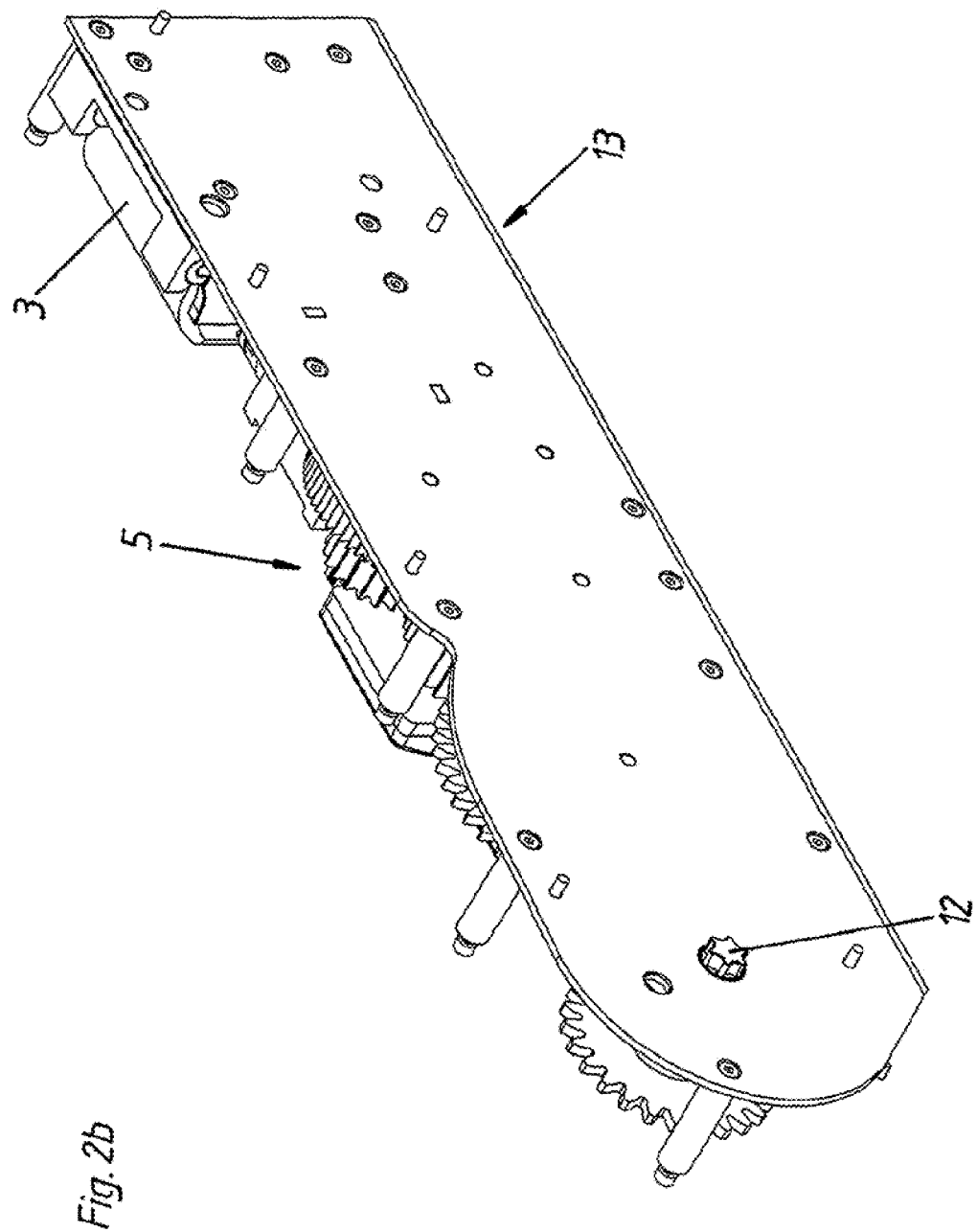

FIGS. 2a and 2b show the unit 13 with the unit 14 removed. The force transmission interface between the two units 13 and 14 is represented in this case by the shaft 12 which is drivable by the electric motor 3 by way of the transmission 5 and which has a profiled configuration and which engages into a recess of corresponding configuration connected to the actuator 4. When the shaft 12 rotates, the actuator 4 is also correspondingly rotated.

The drive train (see FIG. 2a) of the furniture drive 1 according to the invention begins at the left in FIG. 2a with the electric motor 3 which co-operates by way of a worm drive with a first transmission stage of the transmission 5. In this case, arranged between the electric motor 3 and the transmission 5 is a dog clutch 9 which serves for sound decoupling and to compensate for axial misalignments. In this embodiment, the transmission 5 further has an overload safety device 10 which is intended to prevent damage to the electric motor 3 due to an excessive force being applied to the actuator 4. A freewheel coupling 16 permits the movement of the furniture part 2 over a defined range (for example shortly before the closed position of the furniture part 2) without impediment by the electric motor 3. In that way, it is possible in that region to achieve a preferred sequence of movements for the furniture part 2 by purely mechanical components (for example pull-in device), instead of having to regulate the electric motor 3 by way of a regulating system for that purpose.

Figure 3:
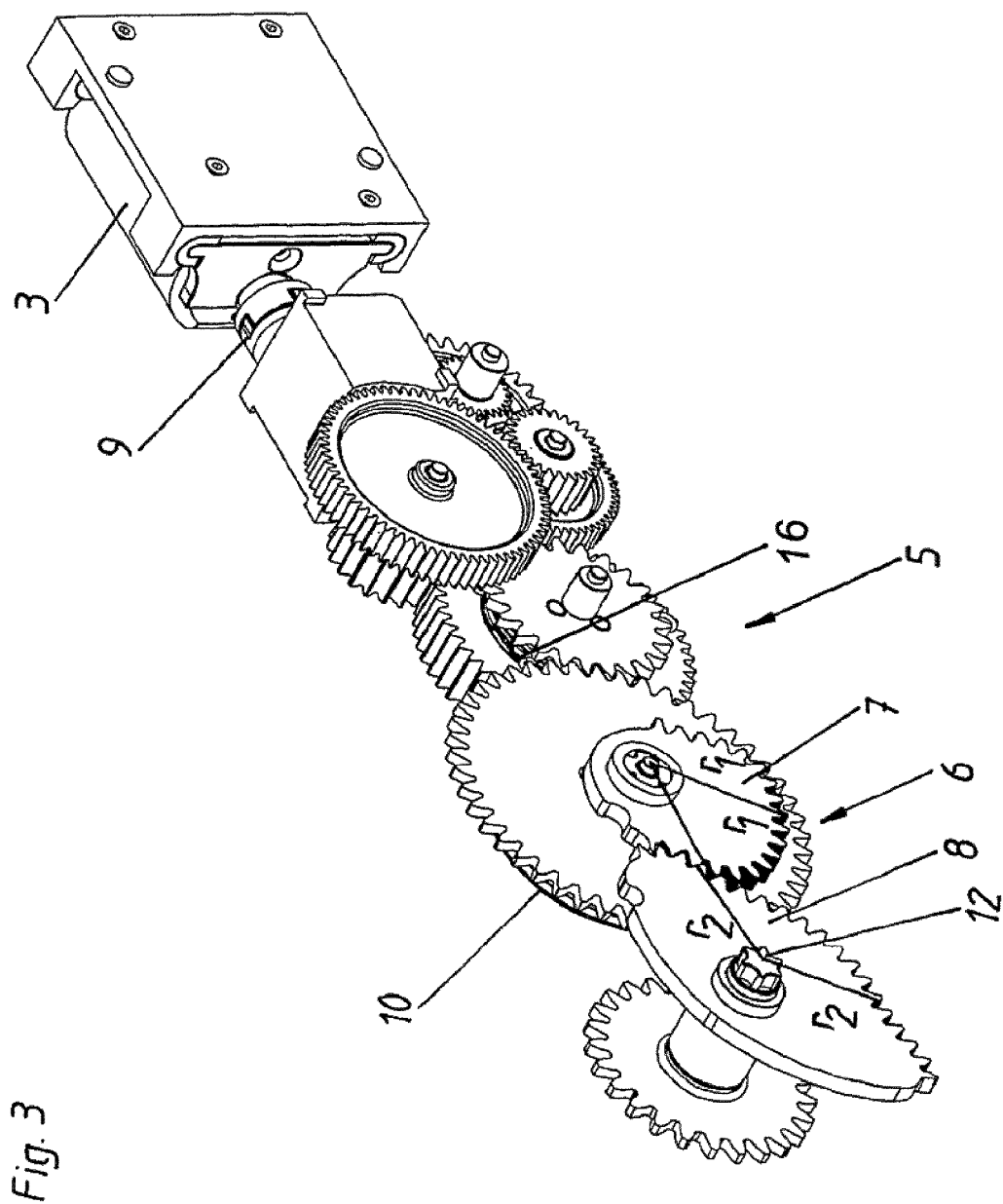
FIG. 3 shows a view corresponding to FIGS. 2a and 2b, but in which the view of all components not directly belonging to the drive line has been omitted.

Now, the gears 7, 8 of the transmission stage which is in the form of an eccentric transmission 6, as can be particularly clearly seen in FIG. 3, are of particular interest. The Figure shows two different radii r1, r2, wherein the radii r1 relates to the gear 7 and the radii r2 relates to the gear 8. It is now of significance that the respective radii r1, r2 (respectively measured from the respective axis of rotation of the gear to the gear rim) alter in a predefined fashion in such a way as to give the desired torque configuration. As in this case, the axes of rotation of the two gears 7, 8 are arranged at a fixed spacing relative to each other, here the radius r1 of the gear 7 coupled to the electric motor 3 and the radius r2 of the gear 8 connected to the actuator 4 (via shaft 12) must respectively change in such a way that in total that gives precisely the spacing between the two axes of rotation.

Figure 4C:
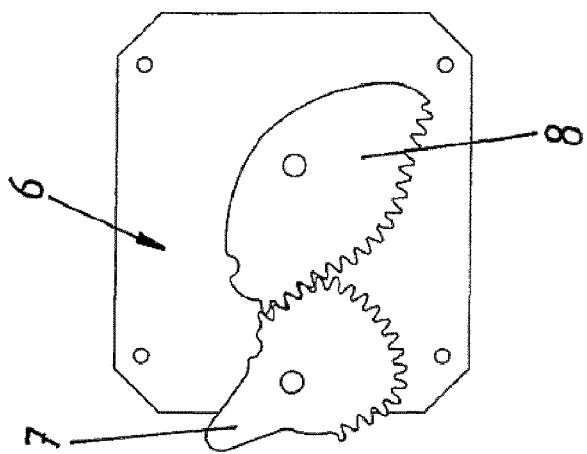
FIGS. 4a-4c show an eccentric transmission which can be used in a furniture drive according to the invention in three different positions.
Figure 4B:
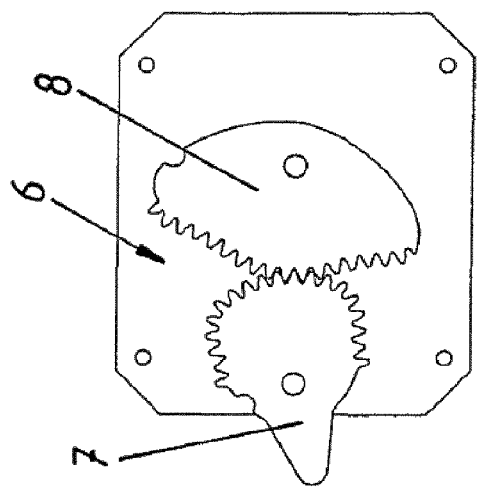
Figure 4A:
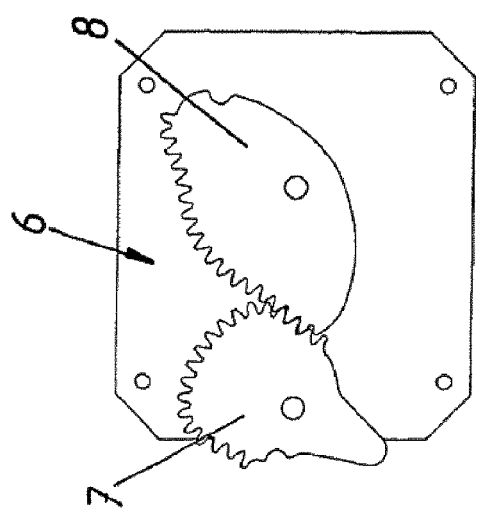

FIGS. 4a-4c show an eccentric transmission 6 which can be used according to the invention and which in this specific embodiment differs somewhat from the eccentric transmission 6 shown in FIGS. 1-3. This difference however only concerns the configuration of the gears 7, 8 in a region away from the gear rim and is therefore irrelevant for the mode of operation according to the invention.

The end positions of the eccentric transmission 6, shown in FIGS. 4a and 4c respectively, correspond to a closed end position (FIG. 4a) of the furniture part 2 and a fully opened end position (FIG. 4c) of the movable furniture part 2 respectively. The position in FIG. 4b corresponds to an intermediate position of the movable furniture part 2. It is now of significance that the transmission ratio of the eccentric transmission and thus the entire transmission 5 decreases upon a rotary movement of the gears 7, 8 starting from the end positions in FIGS. 4a and 4c, in each case over a defined rotary angle range. In the illustrated embodiment, the transmission ratio is at a minimum value at a midway position approximately halfway along the total rotary angle range between the two end positions (this being equivalent to a minimum torque of the gear 8 operating as the drive output gear and a maximum peripheral speed of the gear 8). In other words, because the gear 8 is connected to actuator 4 via shaft 12, when the actuator 4 is in the middle between its two end positions, the transmission ratio is at a minimum value due the shapes of gears 7 and 8 as shown in FIGS. 4a-4c. In the embodiment shown, the illustrated rotary angle range between the two end positions corresponds to an opening angle of the movable furniture part 2 of about 150°. Other opening angles and rotary angle ranges of the eccentric transmission 6, of a corresponding nature, can naturally be envisaged.

Depending on the respective position of the two gears 7, 8 relative to each other, there are different effective lever lengths for force transmission and thus the desired different levels of torque.

Figure 5A:
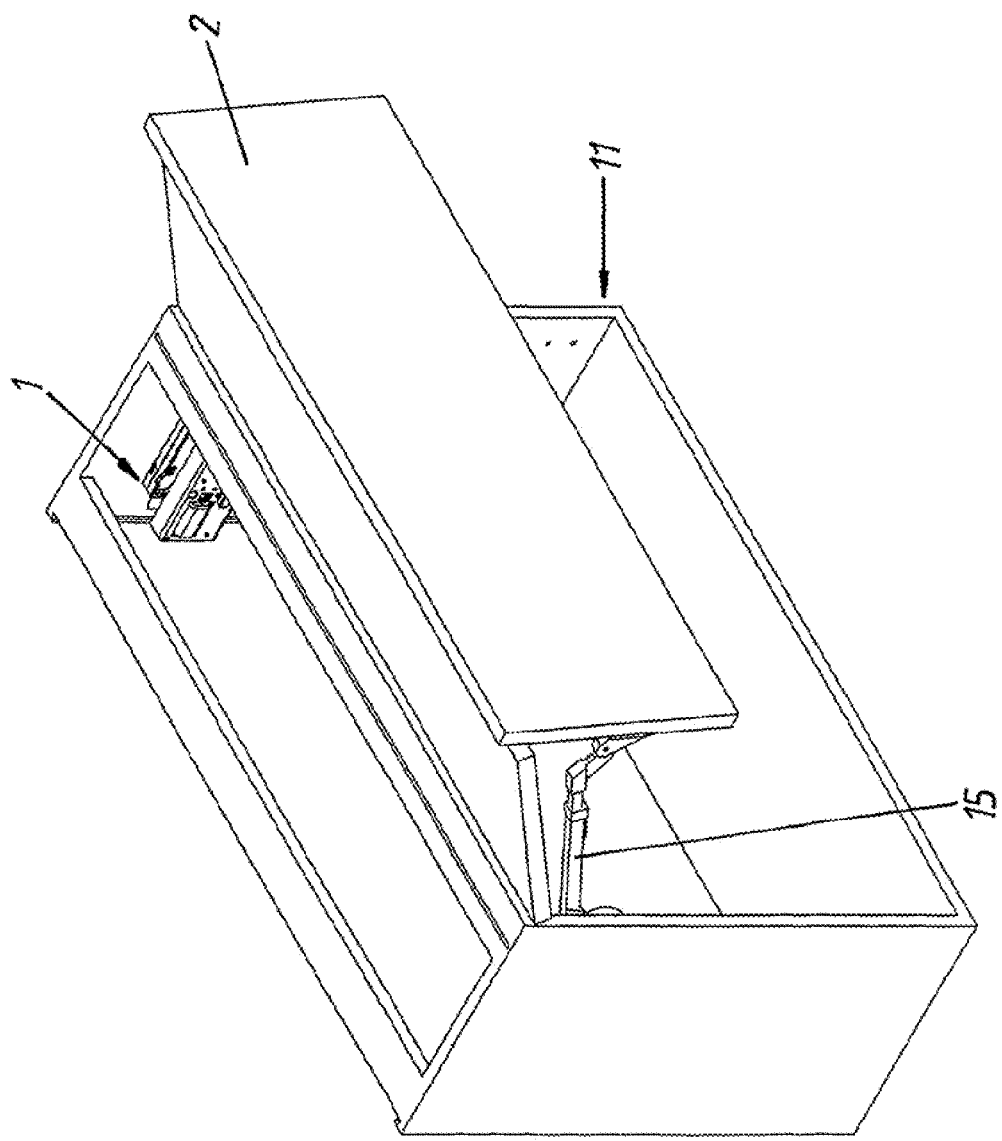
FIGS. 5a and 5b show the furniture drive according to the invention in the mounted condition in a furniture carcass.
Figure 5B:
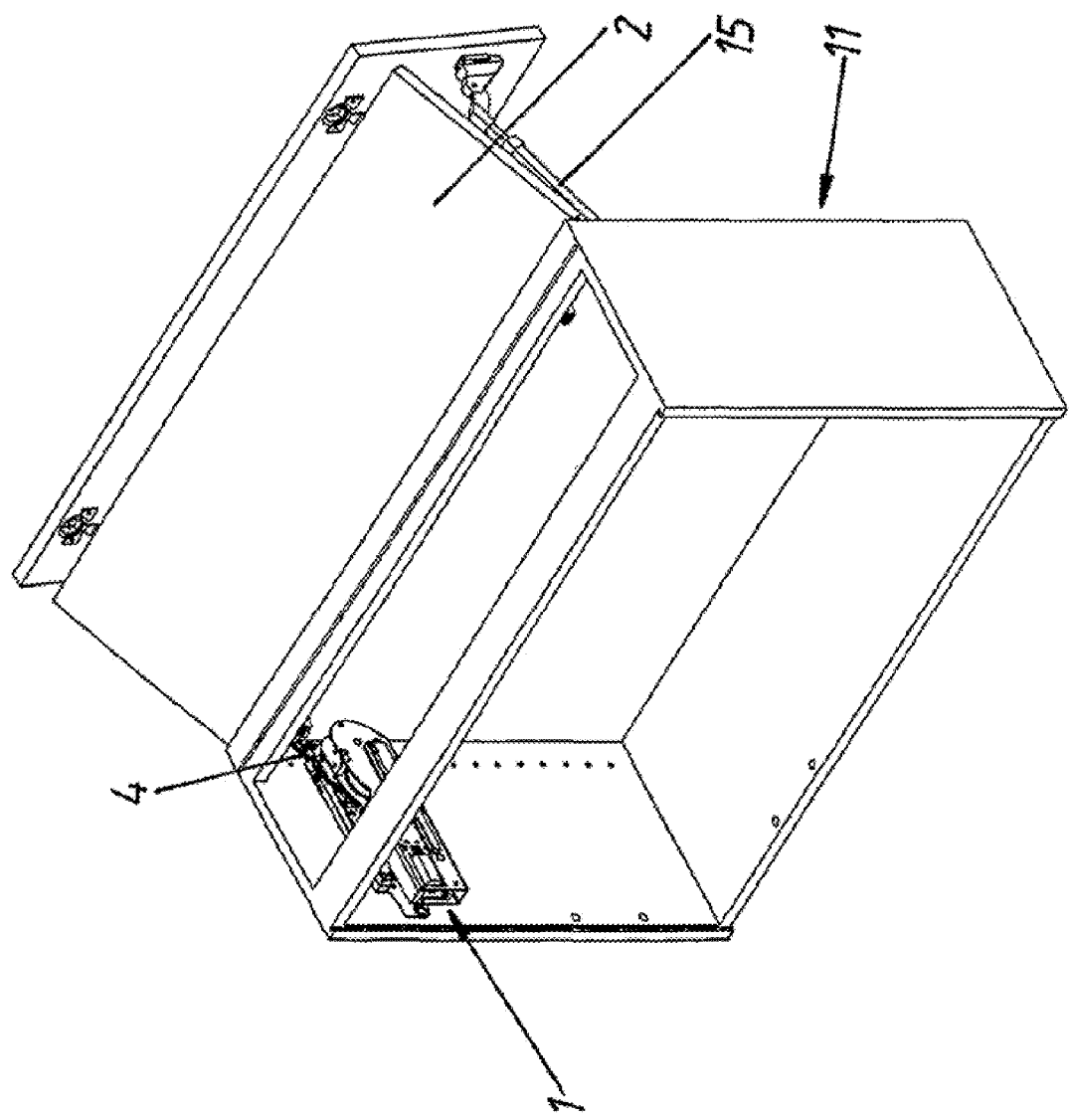

FIGS. 5a and 5b respectively show a front view and a rear view of an article of furniture 11, a furniture drive 1 according to the invention having been mounted at the left-hand side of the furniture carcass. In this case, the actuator 4 of the furniture drive 1 is connected by way of a lever mechanism 15 to the furniture part 2 to be driven. In the illustrated embodiment, a furniture drive 1 according to the invention is provided only at one side of the furniture carcass while only the mechanical unit 14 is arranged on the other side. It will be appreciated that it would also be possible to envisage the provision of units 13 and thus complete furniture drives 1 according to the invention, at both sides of the furniture carcass.

Triggering of this furniture drive 1 according to the invention can be implemented in a per se known manner by way of a touch-latch functionality. With that functionality, a slight movement, caused by the user, of the movable furniture part 2 (for example by being pushed in or pulled) is detected by a sensor and consequently the activation command is given to the furniture drive 1. That is effected by a control or regulating unit, that is already known per se, for the furniture drive 1, which can be integrated in the furniture drive 1 itself.

In the preferred embodiment shown in the Figures, the gears 7, 8 are of an approximately asymmetric configuration insofar as the transmission ratio decreases more greatly, starting from the end position of the gears 7, 8, that corresponds to the closed end position of the furniture part, than starting from the end position of the gears 7, 8, that corresponds to the opened end position of the furniture part. The reason for this is that in the preferred embodiment, the furniture part is a flap which can be more easily set in motion from the opened end position due to the support of the force of gravity and the lack of a force storage means which is to be loaded up in respect of an automatic pull-in arrangement.

All representations in the Figures are to scale and with correct angles.

The invention claimed is:

1. A furniture drive for driving a movable furniture part, said furniture drive comprising:
   an electric motor;
   an actuator configured to reciprocate between two end positions so as to apply force to the furniture part to be driven; and
   a transmission connected between said electric motor and said actuator, said transmission having a transmission stage comprising an eccentric transmission including two mutually meshing gears, a first one of said two gears being connected to said actuator and a second one of said two gears being coupled to said electric motor so that said eccentric transmission has two end positions corresponding to said end positions of said actuator, and so that a transmission ratio decreases upon a rotation of said two gears from each of said two end positions towards a center position of said eccentric transmission over a defined rotary angle range;
   wherein axes of rotation of said two gears of said eccentric transmission are arranged at a fixed spacing from each other; and
   wherein a radius of said second one of said two gears increases starting from each end position over said defined rotary angle range, and a radius of said first one of said two gears correspondingly decreases starting from each end position over said defined rotary angle range.

2. The furniture drive according to claim 1, wherein said transmission ratio has a minimum value at a midway position approximately halfway through the total rotary angle range between said two end positions.

3. The furniture drive according to claim 1, further comprising a freewheel coupling and/or an overload safety device connected between said second one of said two gears and said electric motor.

4. The furniture drive according to claim 1, further comprising a shaft non-rotatably connected to said first one of said gears for driving said actuator.

5. An article of furniture comprising:
   a movably-mounted furniture part; and
   said furniture drive according to claim 1 arranged to move said movably-mounted furniture part.

6. The article of furniture according to claim 5, wherein said movably-mounted furniture part is one of a flap, a door, and a drawer.

7. A furniture drive for driving a movable furniture part, said furniture drive comprising:
   an electric motor;
   an actuator configured to reciprocate between two end positions so as to apply force to the furniture part to be driven; and
   a transmission connected between said electric motor and said actuator, said transmission having a transmission stage comprising an eccentric transmission including two mutually meshing gears, a first one of said two gears being connected to said actuator and a second one of said two gears being coupled to said electric motor so that said eccentric transmission has two end positions corresponding to said end positions of said actuator, and so that a transmission ratio decreases upon a rotation of said two gears from each of said two end positions towards a center position of said eccentric transmission over a defined rotary angle range;
   wherein said transmission ratio has a minimum value at a midway position approximately halfway through the total rotary angle range between said two end positions.

8. The furniture drive according to claim 7, wherein axes of rotation of said two gears of said eccentric transmission are arranged at a fixed spacing from each other.

9. The furniture drive according to claim 8, wherein a radius of said second one of said two gears increases starting from each end position over said defined rotary angle range, and a radius of said first one of said two gears correspondingly decreases starting from each end position over said defined rotary angle range.

10. The furniture drive according to claim 7, further comprising a freewheel coupling and/or an overload safety device connected between said second one of said two gears and said electric motor.

11. The furniture drive according to claim 7, further comprising a shaft non-rotatably connected to said first one of said gears for driving said actuator.

12. An article of furniture comprising:
    a movably-mounted furniture part; and
    said furniture drive according to claim 7 arranged to move said movably-mounted furniture part.

13. The article of furniture according to claim 12, wherein said movably-mounted furniture part is one of a flap, a door, and a drawer.

14. A furniture drive for driving a movable furniture part, said furniture drive comprising:
    an electric motor;
    an actuator configured to reciprocate between two end positions so as to apply force to the furniture part to be driven;
    a transmission connected between said electric motor and said actuator, said transmission having a transmission stage comprising an eccentric transmission including two mutually meshing gears, a first one of said two gears being connected to said actuator and a second one of said two gears being coupled to said electric motor so that said eccentric transmission has two end positions corresponding to said end positions of said actuator, and so that a transmission ratio decreases upon a rotation of said two gears from each of said two end positions towards a center position of said eccentric transmission over a defined rotary angle range; and
    a freewheel coupling and/or an overload safety device connected between said second one of said two gears and said electric motor.

15. The furniture drive according to claim 14, wherein axes of rotation of said two gears of said eccentric transmission are arranged at a fixed spacing from each other.

16. The furniture drive according to claim 15, wherein a radius of said second one of said two gears increases starting from each end position over said defined rotary angle range, and a radius of said first one of said two gears correspondingly decreases starting from each end position over said defined rotary angle range.

17. The furniture drive according to claim 14, wherein said transmission ratio has a minimum value at a midway position approximately halfway through the total rotary angle range between said two end positions.

18. The furniture drive according to claim 14, further comprising a shaft non-rotatably connected to said first one of said gears for driving said actuator.

19. An article of furniture comprising:
a movably-mounted furniture part; and
said furniture drive according to claim 14 arranged to move said movably-mounted furniture part.

20. The article of furniture according to claim 19, wherein said movably-mounted furniture part is one of a flap, a door, and a drawer.

\* \* \* \* \*